Oct. 17, 1944.　　　D. R. MATTOON　　2,360,570
GLASS FILTER AND METHOD OF MANUFACTURE THEREOF

Filed Nov. 1, 1941

Inventor
DEO R. MATTOON

Attorney

Patented Oct. 17, 1944

2,360,570

UNITED STATES PATENT OFFICE 2,360,570

GLASS FILTER AND METHOD OF MANUFACTURE THEREOF

Deo R. Mattoon, Corning, N. Y., assignor to Corning Glass Works, Corning, N. Y., a corporation of New York Application November 1, 1941, Serial No. 417,534

7 Claims. (Cl. 210—162)

The present invention relates to filtering units, and is particularly concerned with a novel method of perforating glass articles in a manner which is economical and satisfactory for the manufacture of coffee baskets for use in percolators and the like, although the invention is not necessarily limited to such use.

A filter unit such as required for use as the coffee basket of a percolator, to operate satisfactorily, must have apertures therethrough of such size and number or character as to permit the passage of a large volume of fluid therethrough without overflowing. Also the size and shape of the perforations must be such as to prevent an appreciable amount of sediment from passing therethrough. In the past great difficulty and expense has been involved in imparting these qualities to glass coffee baskets, prohibiting their use in popular priced ware.

An object of the present invention is an economical method of perforating articles.

Another object is a new article of manufacture.

Figure 1:
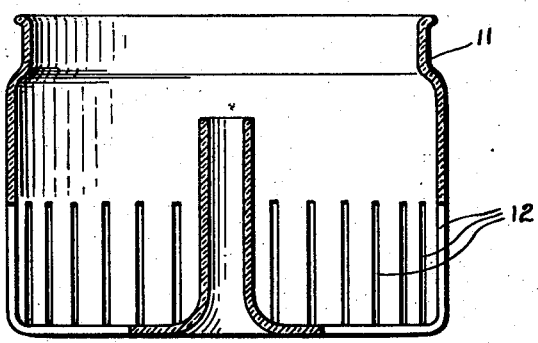
Figure 2:
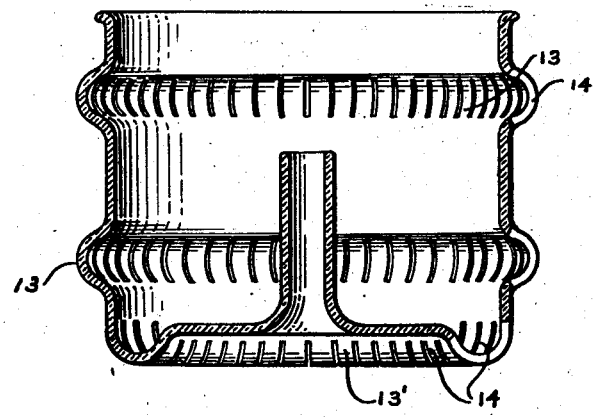

Fig. 1 of the accompanying drawing is a side elevational view in section of a coffee basket embodying the invention, and Fig. 2 is a similar view of an alternative form of coffee basket also embodying the invention.

In the structure of Fig. 1 a conventional form of coffee basket 11 is provided with suitably spaced slots 12 formed in the wall and bottom thereof where they adjoint one another. These slots may be economically made by sawing, preferably followed by a fire polishing treatment.

In the structure of Fig. 2 the basket has ridges or corrugations 13 and 13' formed therein to form wall and bottom portions through which slotted perforations 14 may be readily sawed.

Obviously filter plates and/or units of various other configurations composed of glass or other suitable materials can be perforated in a similar manner without departing from the spirit and scope of the invention.

What is claimed is:

1. As an article of manufacture a glass filter comprising a bottom and an adjoining side wall having slots therethrough where they adjoin one another.

2. As an article of manufacture a glass filter comprising a ridged bottom and an adjoining ridged side wall, said bottom and side wall having slots therethrough which extend transversely through the ridges thereof.

3. The method of manufacturing a glass strainer basket for a percolator which includes forming a container with a closed bottom and a surrounding upstanding side wall and cutting slots through the bottom and side wall where they adjoin one another.

4. The method of manufacturing a glass strainer basket for a percolator which includes forming a corrugation in a wall of the basket and then perforating the basket wall by cutting slots transversely through the corrugations.

5. The method of manufacturing a glass strainer basket for a percolator which includes forming a basket with corrugations therein in parts thereof to contain perforations and then sawing slots transversely through the corrugations.

6. A circular open topped glass strainer basket for a percolator having a bottom and an adjoining sidewall and having perforations therethrough in the form of slots extending downward from a height well below the top of the sidewall and inward through the bottom a substantial distance toward the axial center of the basket.

7. A circular open topped glass strainer basket for a percolator having a sidewall and an adjoining bottom wall, said bottom wall having a central portion thereof elevated to form a channel in the basket where its side and bottom walls adjoin one another, the basket wall portions forming said channel having slots therethrough arranged transverse to the channel.

DEO R. MATTOON.